(12) United States Patent
Liu et al.

(10) Patent No.: US 11,795,245 B2
(45) Date of Patent: Oct. 24, 2023

(54) HYDROPHOBIC POLYVINYL ALCOHOL AND METHOD FOR PREPARING HYDROPHOBIC POLYVINYL ALCOHOL

(71) Applicant: INDUSTRIAL TECHNOLOGY RESEARCH INSTITUTE, Hsinchu (TW)

(72) Inventors: Yi-Chun Liu, Zhudong Township (TW); Pei-Ching Liu, Miaoli (TW); Ting-Ting Chang, Taichung (TW); Tien-Shou Shieh, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/846,782

(22) Filed: Jun. 22, 2022

(65) Prior Publication Data

US 2023/0174686 A1     Jun. 8, 2023

(30) Foreign Application Priority Data

Dec. 3, 2021    (TW) .................. 110145153

(51) Int. Cl.
*C08F 8/04* (2006.01)

(52) U.S. Cl.
CPC ...................... *C08F 8/04* (2013.01)

(58) Field of Classification Search
CPC ...... C08F 16/06; C08F 116/06; C08F 216/06; C08F 8/44; C08F 8/14; C08F 8/30
See application file for complete search history.

(56) References Cited

U.S. PATENT DOCUMENTS

| 4,350,788 A | 9/1982 | Shimokawa et al. |
| 5,712,334 A * | 1/1998 | Watanabe ............. C08G 63/00 524/161 |

(Continued)

FOREIGN PATENT DOCUMENTS

| EP | 2 518 542 A1 | 10/2012 |
| JP | 2009-53675 A | 3/2009 |

(Continued)

OTHER PUBLICATIONS

Sheikh et al., "Novel Self-assembled amphiphilic poly(ε-caprolactone)-grafted-poly(vinyl alcohol) nanoparticles: hydrophobic and hydrophilic drugs carrier nanoparticles", J. Mater Sci: Mater Med., 2009, 20, 821-831.

(Continued)

*Primary Examiner* — Robert C Boyle
(74) *Attorney, Agent, or Firm* — Birch, Stewart, Kolasch & Birch, LLP

(57) ABSTRACT

A hydrophobic polyvinyl alcohol and a method for preparing hydrophobic polyvinyl alcohol are provided. The hydrophobic polyvinyl alcohol includes a first repeat unit represented by Formula (I), a second repeat unit represented by Formula (II), and a third repeat unit represented by Formula (III)

Formula (I)

(Continued)

-continued

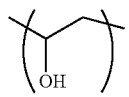

Formula (II)

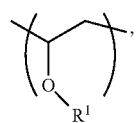

Formula (III)

wherein $R^1$ is —Si$(R^2)_3$,

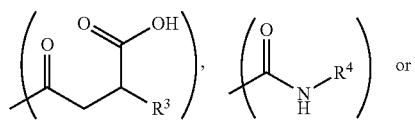

, or

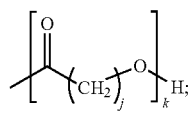

$R^2$ is independently $C_{1-6}$ alkoxy group, $C_{6-18}$ alkyl group, or $C_{6-22}$ alkenyl group, and at least one $R^2$ is $C_{6-18}$ alkyl group or $C_{6-22}$ alkenyl group; $R^3$ and $R^4$ are independently $C_{6-18}$ alkyl group or $C_{6-22}$ alkenyl group; j is 3 to 7; and k is 1 to 30.

19 Claims, 2 Drawing Sheets

(56) References Cited

U.S. PATENT DOCUMENTS

| | | | |
|---|---|---|---|
| 6,921,729 | B2 | 7/2005 | Schwab et al. |
| 7,803,896 | B2 | 9/2010 | Chen et al. |
| 8,404,066 | B2 * | 3/2013 | Goto .................... G02B 5/3033 |
| | | | 156/229 |
| 8,653,182 | B2 | 2/2014 | Tanaka et al. |
| 8,664,333 | B2 | 3/2014 | Shibutani et al. |
| 2010/0041846 | A1 * | 2/2010 | Hood .................... C08F 226/10 |
| | | | 526/264 |
| 2011/0195250 | A1 | 8/2011 | Okawa |
| 2015/0368384 | A1 * | 12/2015 | Shibutani ............... C09J 129/04 |
| | | | 525/60 |

FOREIGN PATENT DOCUMENTS

| | | |
|---|---|---|
| JP | 4390382 B2 | 12/2009 |
| JP | 4827464 B2 | 11/2011 |
| TW | 201623346 A | 7/2016 |
| TW | 201830063 A | 8/2018 |
| TW | 201936668 A | 9/2019 |
| TW | 202126703 A | 7/2021 |

OTHER PUBLICATIONS

TWOA dated May 23, 2022 for the corresponding application No. 110145153.

* cited by examiner

HYDROPHOBIC POLYVINYL ALCOHOL AND METHOD FOR PREPARING HYDROPHOBIC POLYVINYL ALCOHOL

CROSS REFERENCE TO RELATED APPLICATIONS

The application is based on, and claims priority from, Taiwan Application Serial Number 110145153, filed on Dec. 3, 2021, the disclosure of which is hereby incorporated by reference herein in its entirety.

TECHNICAL FIELD

The disclosure relates to a hydrophobic polyvinyl alcohol and a method for preparing hydrophobic polyvinyl alcohol.

BACKGROUND

Polarizer is one of the main elements of liquid-crystal displays (LCD). A polarizer includes a polarizing layer, upper and lower adhesive layers, upper and lower protective/release layers, and a reflective film, wherein the polarizing layer is made of polyvinyl alcohol (PVA) film after dyeing and stretching.

The dyeing material of the polarizing layer is usually iodine, which sublimates under slight heat. The waste polarizer will cause a purple smoke during incineration, which has a great impact on the environment. Therefore, the most environmental friendly treatment for waste polarizer is to remove iodine from the polarizers and recycle the remaining polyvinyl alcohol resin.

Polyvinyl alcohol resin is a water-soluble polymer with high crystallinity. It is widely used in packaging, construction, papermaking and so on. However, the polyvinyl alcohol resin in the polarizer can only be swelled but is insoluble in water or other organic solvents since the polyvinyl alcohol resin is cross-linked by boron acid in the manufacturing process, thereby limiting the possibility of reusing the polyvinyl alcohol resin.

SUMMARY

The disclosure provides a hydrophobic polyvinyl alcohol. According to embodiments of the disclosure, the hydrophobic polyvinyl alcohol includes a first repeating unit, a second repeating unit, and a third repeating unit, wherein the first repeating unit has a structure represented by Formula (I), the second repeating unit has a structure represented by Formula (II), and the third repeating unit has a structure represented by Formula (III):

Formula (I)

Formula (II)

Formula (III)

wherein $R^1$ is $-Si(R^2)_3$, or $R^2$ are independently $C_{1-6}$ alkoxy group, $C_{6-18}$ alkyl group, or $C_{6-22}$ alkenyl group, and at least one of $R^2$ is $C_{6-18}$ alkyl group, or $C_{6-22}$ alkenyl group; $R^3$ and $R^4$ are independently $C_{6-18}$ alkyl group, or $C_{6-22}$ alkenyl group; j is 3 to 7; and k is 1 to 30.

The disclosure also provides a method for preparing hydrophobic polyvinyl alcohol of the disclosure. According to other embodiments of the disclosure, the method for preparing hydrophobic polyvinyl alcohol can include following steps. A first polymer is provided, wherein the first polymer is a product of polyvinyl alcohol and boric acid via a crosslinking reaction, wherein the boron content (B1) in the first polymer is 1 wt % to 5 wt %, based on the weight of the first polymer. The first polymer is subjected to a deboration treatment, obtaining a second polymer, wherein the boron content (B2) in the second polymer is about 0.05 wt % to 0.5 wt %, based on the weight of the second polymer. The second polymer is modified by a modifier, obtaining the hydrophobic polyvinyl alcohol of the disclosure.

A detailed description is given in the following embodiments.

DETAILED DESCRIPTION

The hydrophobic polyvinyl alcohol and the method for preparing hydrophobic polyvinyl alcohol are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. As used herein, the term "about" in quantitative terms refers to plus or minus an amount that is general and reasonable to persons skilled in the art. As used herein, the term "about" in quantitative terms refers to plus or minus an amount that is general and reasonable to persons skilled in the art.

Moreover, the use of ordinal terms such as "first", "second", "third", etc., in the disclosure to modify an element does not by itself connote any priority, precedence, or order of one claim element over another or the temporal order in which it is formed, but are used merely as labels to distinguish one claim element having a certain name from another element having the same name (but for use of the ordinal term) to distinguish the claim elements.

The disclosure provides a hydrophobic polyvinyl alcohol and a method for preparing hydrophobic polyvinyl alcohol. Since a boron acid is used to crosslink the polyvinyl alcohol in the manufacturing process of polarizer, the polyvinyl alcohol resin recovered from the polarizer cannot be soluble in water or other organic solvents, resulting in the recovered crosslinked polyvinyl alcohol resin exhibiting poor processability. Polyvinyl alcohol resin is a water-soluble polymer with high crystallinity. It is widely used in packaging, construction, papermaking and so on. However, the polyvinyl alcohol resin in the polarizer can only swell but is insoluble in water or other organic solvents since the polyvinyl alcohol resin is cross-linked by boron acid in the manufacturing process, thereby limiting the reuse possibility of the polyvinyl alcohol resin. In the disclosure, the cross-linking degree of the recovered crosslinked polyvinyl alcohol resin is reduced by a deboration treatment (i.e. the boron content of recovered crosslinked polyvinyl alcohol resin is reduced), obtaining a low crosslinking degree polyvinyl alcohol resin with flowability. Further, the low crosslinking degree polyvinyl alcohol resin can be soluble in water or organic solvent. In addition, since the obtained low crosslinking degree polyvinyl alcohol resin still has boron cross-linked structure (i.e. boron in the crosslinked polyvinyl alcohol resin is not removed completely), the water resistance of the material can be enhanced. In addition, in the disclosure, a modifier is reacted with the hydroxyl group of the low crosslinking degree polyvinyl alcohol resin via a hydrophobic modification process to introduce a hydrophobicity group into the low crosslinking degree polyvinyl alcohol resin, obtaining the hydrophobic polyvinyl alcohol. As a result, the surface energy and the melting point of the polyvinyl alcohol can be reduced, and the processability of the polyvinyl alcohol can be enhanced. According to embodiments of the disclosure, the hydrophobic polyvinyl alcohol of the disclosure exhibits flowability, processability, and hydrophobicity, and is suitable for textile (such as fluorine-free water repellent), rubber materials, wastewater treatment and other fields.

According to embodiments of the disclosure, the disclosure provides a hydrophobic polyvinyl alcohol, includes first repeating unit, a second repeating unit, and a third repeating unit, wherein the first repeating unit has a structure represented by Formula (I), the second repeating unit has a structure represented by Formula (II), and the third repeating unit has a structure represented by Formula (III):

Formula (I)

Formula (II)

Formula (III)

wherein $R^1$ is $-Si(R^2)_3$, or

$R^2$ are independently $C_{1-6}$ alkoxy group, $C_{6-18}$ alkyl group, or $C_{6-22}$ alkenyl group, and at least one of $R^2$ is $C_{6-18}$ alkyl group, or $C_{6-22}$ alkenyl group; $R^3$ and $R^4$ are independently $C_{6-18}$ alkyl group, or $C_{6-22}$ alkenyl group; j is 3 to 7; and k is 1 to 30.

According to embodiments of the disclosure, the $C_{1-6}$ alkoxy group can be linear or branched alkoxy group. For example, the $C_{1-6}$ alkoxy group can be methoxy, ethoxy, propoxy, butoxy, pentoxy, hexoxy, or an isomer thereof. According to embodiments of the disclosure, the $C_{6-18}$ alkyl group can be linear or branched alkyl group. For example, the $C_{6-18}$ alkyl group can be hexyl, heptyl, octyl, nonyl, decyl, undecyl, dodecyl, tridecyl, tetradecyl, pentadecyl, hexadecyl, heptadecyl, octadecyl, or an isomer thereof. According to embodiments of the disclosure, the $C_{6-22}$ alkenyl can be linear or branched alkenyl group. For example, the $C_{6-22}$ alkenyl can be hexenyl, heptenyl, octenyl, nonenyl, decenyl, undecenyl, dodecenyl, tridecenyl, tetradecenyl, pentadecenyl, hexadecenyl, heptadecenyl, octadecenyl, or an isomer thereof. According to embodiments of the disclosure, j can be 3, 4, 5, 6, or 7; and k may be 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30.

According to embodiments of the disclosure, the hydrophobic polyvinyl alcohol can have n number of first repeating units, m number of second repeating units, and i number of third repeating units, wherein n≥2, m≥2, and i≥2. According to embodiments of the disclosure, the number of first repeating units, of second repeating units, and of third repeating units in the hydrophobic polyvinyl alcohol must satisfy the following equation: 0.002≤2n/(2n+m+i)≤0.04, 0.58≤m/(2n+m+i)≤0.783, and 0.195≤i/(2n+m+i)≤0.38. When the relative number of first repeating units is too low (i.e. 2n/(2n+m+i) is too low), the hydrophobic polyvinyl alcohol has relatively low amount of boron crosslinked structure, thereby reducing the water resistance of the hydrophobic polyvinyl alcohol. When the relative number of first repeating units is too high (i.e. 2n/(2n+m+i) is too high), the hydrophobic polyvinyl alcohol has a relatively high amount of boron crosslinked structure, thereby reducing the flowability of the hydrophobic polyvinyl alcohol (or resulting in the hydrophobic polyvinyl alcohol not exhibiting flowability). Furthermore, the solubility (being soluble in water or organic solvent) of the hydrophobic polyvinyl alcohol is reduced. When the relative number of third repeating units is too low (i.e. i/(2n+m+i) is too low), the hydrophobicity of the hydrophobic polyvinyl alcohol is reduced.

According to embodiments of the disclosure, the third repeating unit can be wherein $R^3$, and $R^4$ can be independently $C_{6-13}$ alkyl group, or $C_{6-22}$ alkenyl group; j can be 3 to 7; k can be 1 to 30; $R^5$ can be independently $C_{1-6}$ alkyl group; and $R^6$ may be $C_{6-18}$ alkyl group or $C_{6-22}$ alkenyl group.

According to embodiments of the disclosure, the hydrophobic polyvinyl alcohol can further include a fourth repeating unit, wherein the fourth repeating unit has a structure represented by Formula (IV)

Formula (IV)

According to embodiments of the disclosure, the hydrophobic polyvinyl alcohol can have n number of first repeating units, m number of second repeating units, i number of third repeating units, and p number of fourth repeating units, wherein n≥2, m≥2, i≥2, and p≥2. According to embodiments of the disclosure, the number of first repeating units, second repeating units, third repeating units, and fourth repeating units in the hydrophobic polyvinyl alcohol must satisfy the following equation: 0.002≤(2n+4p)/(2n+m+i+4p)≤0.04, 0.58≤m/(2n+m+i+4p)≤0.783, and 0.195≤i/(2n+m+i+4p) ≤0.38. When the amount of boron crosslinked structure of the hydrophobic polyvinyl alcohol is too low, the water resistance of the hydrophobic polyvinyl alcohol is reduced. When the amount of boron crosslinked structure in the hydrophobic polyvinyl alcohol is too high, the hydrophobic polyvinyl alcohol exhibits low flowability or the hydrophobic polyvinyl alcohol does not exhibit flowability). Further, the solubility (soluble in water or organic solvent) of the hydrophobic polyvinyl alcohol is reduced. When the relative number of third repeating units is too low (i.e. i/(2n+m+i+ 4p) is too low), the hydrophobicity of the hydrophobic polyvinyl alcohol is reduced. According to embodiments of the disclosure, the number ratio (n:p) of the first repeating unit to the fourth repeating unit can be about 1:1 to 99:1, such as 2:1, 3:1, 4:1, 5:1, 6:1, 7:1, 8:1, 9:1, 15:1, 30:1, 50:1, or 70:1.

According to embodiments of the disclosure, the hydrophobic polyvinyl alcohol may have a boron content of about 0.05 wt % to 0.5 wt % (such as: 0.06 wt %, 0.07 wt %, 0.08 wt %, 0.09 wt %, 0.1 wt %, 0.2 wt %, 0.3 wt %, or 0.4 wt %), wherein the boron content means the weight percentage of the boron element in the hydrophobic polyvinyl alcohol, based on the weight of the hydrophobic polyvinyl alcohol. When the boron content of hydrophobic polyvinyl alcohol is too low, the hydrophobic polyvinyl alcohol water resistance is reduced. When the boron content of hydrophobic polyvinyl alcohol is too high, the hydrophobic polyvinyl alcohol exhibits low flowability or the hydrophobic polyvinyl alcohol does not exhibit flowability. Furthermore, the solubility (soluble in water or organic solvent) of the hydrophobic polyvinyl alcohol is reduced.

Figure 1:
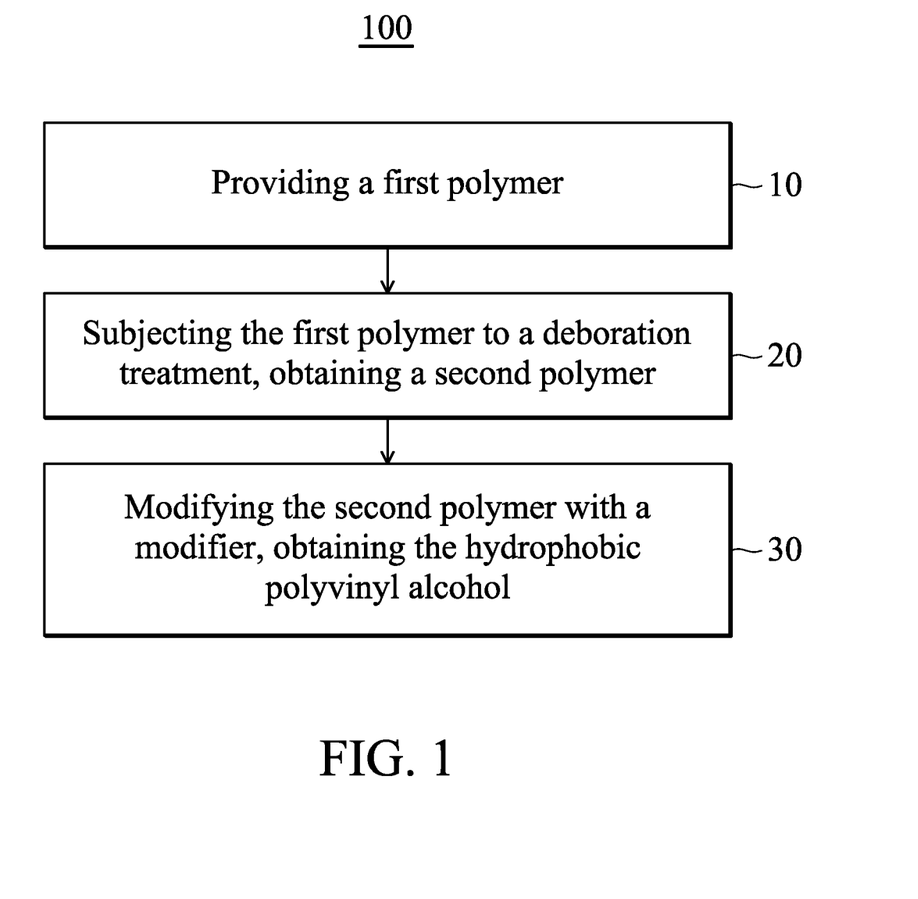
FIG. 1 is a flow chart illustrating a method for preparing hydrophobic polyvinyl alcohol 100 according to an embodiment of the disclosure.

The disclosure also provides a method for preparing hydrophobic polyvinyl alcohol of the disclosure. FIG. 1 is a flow chart illustrating a method for preparing hydrophobic polyvinyl alcohol 100 according to an embodiment of the disclosure. The method for preparing hydrophobic polyvinyl alcohol 100 of the disclosure includes the following steps. First, a first polymer is provided (steps 10), wherein the first polymer is a product of polyvinyl alcohol and boric acid via a crosslinking reaction. Namely, the first polymer can be a polyvinyl alcohol resin (such as an iodine-free crosslinked polyvinyl alcohol resin recovered from polarizer) crosslinked by boron acid. The first polymer can have a boron content B1, wherein the boron content B1 can be about 1 wt % to 5 wt % (such as 1.5 wt %, 2.0 wt %, 2.5 wt %, 3.0 wt %, 3.5 wt %, 4.0 wt %, or 4.5 wt %), based on the weight of the first polymer. Next, the first polymer is subjected to a deboration treatment (steps 20), obtaining a second polymer. In particular, the boron content (B2) in the second polymer can be about 0.05 wt % to 0.5 wt % (such as: 0.06 wt %, 0.07 wt %, 0.08 wt %, 0.09 wt %, 0.1 wt %, 0.2 wt %, 0.3 wt %, or 0.4 wt %), based on the weight of the second polymer. By means of the deboration treatment, the boron content (B1) in the first polymer and the boron content (B2) in the second polymer must satisfy the following equation: 0.6≤(B1−B2)/B1≤0.9. Namely, in the first polymer, 60 wt % to 90 wt % of boron is removed via the deboration treatment (based on the original boron content in the first polymer). Next, the second polymer is subjected to a modification with a modifier, obtaining the hydrophobic polyvinyl alcohol of the disclosure (step 30).

According to embodiments of the disclosure, the first polymer has the first repeating unit, the second repeating unit, and the fourth repeating unit, wherein the first repeating unit has a structure represented by Formula (I), the second repeating unit has a structure represented by Formula (II), and the fourth repeating unit has a structure represented by Formula (IV):

Formula (I)

Formula (II)

Formula (IV)

According to embodiments of the disclosure, the first polymer can have a number of first repeating units, b number of second repeating units, and c number of fourth repeating units. According to embodiments of the disclosure, the number of first repeating units, second repeating units, and fourth repeating units of the first polymer must satisfy the following equation: $0.2 \leq (2a+4c)/(2a+b+4c) \leq 0.5$, and $0.5 \leq b/(2a+b+4c) \leq 0.8$. In addition, according to embodiments of the disclosure, the number ratio (a:c) of the first repeating unit to the fourth repeating unit can be about 1:1 to 99:1, such as 2:1, 3:1, 4:1, 5:1, 6:1, 7:1, 8:1, 9:1, 15:1, 30:1, 50:1, or 70:1.

According to embodiments of the disclosure, the second polymer can have the same repeating units as the first polymer. Namely, the second polymer can have the first repeating unit, the second repeating unit, and the fourth repeating unit. According to embodiments of the disclosure, the second polymer has d number of first repeating units, e number of second repeating units, and f number of fourth repeating units. According to embodiments of the disclosure, the number of first repeating units, second repeating units, and fourth repeating units of the first polymer must satisfy the following equation: $0.2 \leq (2a+4c)/(2a+b+4c) \leq 0.5$, and $0.5 \leq b/(2a+b+4c) \leq 0.8$. In addition, According to embodiments of the disclosure, in the second polymer, the number ratio (a:c) of the first repeating unit to the fourth repeating unit can be about 1:1 to 99:1, such as 2:1, 3:1, 4:1, 5:1, 6:1, 7:1, 8:1, 9:1, 15:1, 30:1, 50:1, or 70:1. According to embodiments of the disclosure, the total number (a+c) of first repeating units and fourth repeating units in the first polymer may be greater than the total number (d+f) of first repeating units and fourth repeating units in the second polymer (i.e. the number of first repeating units in the first polymer, the number of fourth repeating units in the first polymer, the number of first repeating units in the second polymer, and the number of fourth repeating units in the second polymer must satisfy the following equation: $(a+c)>(d+f)$).

According to embodiments of the disclosure, the modifier can be $C_{6-18}$ alkyl group, a siloxane having a $C_{6-22}$ alkenyl group, a succinic anhydride having a $C_{6-18}$ alkyl group, a succinic anhydride having $C_{6-22}$ alkenyl group, an isocyanate having a $C_{6-18}$ alkyl group, an isocyanate having a $C_{6-22}$ alkenyl group, or a lactone having 3-7 carbon atoms.

According to embodiments of the disclosure, the modifier can be $Si(R^2)_4$, $R^2$ are independently $C_{1-6}$ alkoxy group, $C_{6-18}$ alkyl group, or $C_{6-22}$ alkenyl group, and at least one of $R^2$ is $C_{6-18}$ alkyl group, or $C_{6-22}$ alkenyl group, and at least one $R^2$ is $C_{1-6}$ alkoxy group; $R^3$ and $R^4$ is $C_{6-18}$ alkyl group, or $C_{6-22}$ alkenyl group; and j is 3 to 7. For example, the modifier can be hexyltriethoxysilane, octyltriethoxysilane, decyltriethoxysilane, dodecyltriethoxysilane, hexadecyltrimethoxysilane, octadecyltriethoxysilane, decenyltrimethoxysilane, dodecenyltriethoxysilane, decyl succinic anhydride, dodecyl succinic anhydride, octadecyl succinic anhydride, docosyl succinic anhydride, decenyl succinic anhydride, dodecenyl succinic anhydride, octadecenyl succinic anhydride, docosenyl succinic anhydride, hexyl isocyanate, octyl isocyanate, dodecyl isocyanate, octadecyl isocyanate, dodecenyl isocyanate, octadecenyl isocyanate, γ-butyrolactone, δ-valerolactone, ε-caprolactone, or a combination thereof.

According to embodiments of the disclosure, the deboration treatment can include the following steps. The first polymer is mixed with water, obtaining a first mixture. Herein, the weight ratio of the first polymer to the first mixture can be 1:100 to 10:100. Next, an acidic aqueous solution is added into the first mixture to adjust the pH value of the first mixture to 1-5, and then the result is heated (at 50° C. to 90° C.). After stirring for 2 to 4 hours, a first-polymer-containing solution is obtained. According to embodiments of the disclosure, the acidic aqueous solution can be hydrochloric acid aqueous solution, nitric acid aqueous solution, acetic acid aqueous solution, sulfuric acid aqueous solution, or a combination thereof. The concentration of the acidic aqueous solution can be 0.5M to 6M. Next, an ion-exchange resin is mixed with the first-polymer-containing solution. After stirring for 4 hours to 12 hours, a second mixture is obtained. Next, the second mixture is filtered to remove the ion-exchange resin, obtaining a filtrate. Next, the filtrate is dried, obtaining the second polymer.

According to embodiments of the disclosure, the ion-exchange resin can be an ion-exchange resin selective for boron. The boron selective ion-exchange resin is not particularly limited as long as it is an ion-exchange resin having boron adsorption performance, but a boron adsorption resin having an N-methylglucamine group as an exchange group is preferable. Examples of ion-exchange resins having an N-methylglucamine group can be DIAION-CRB01 (commercially available from Mitsubishi Chemicals Corp), DIAION-CRB02 (commercially available from Mitsubishi Chemicals Corp), AMPERLITE-IRA743 (commercially available from Rohm Haas), or DUOLITE-A368 (commercially available from Sumitomo Chemical Co., Ltd.). According to embodiments of the disclosure, the amount of ion-exchange resin can be 1 wt % to 10 wt % (such as 2 wt %, 5.0 wt %, 7 wt %, or 9 wt %), based on the weight of the first polymer.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLE

Preparation Example 1

Figure 2:
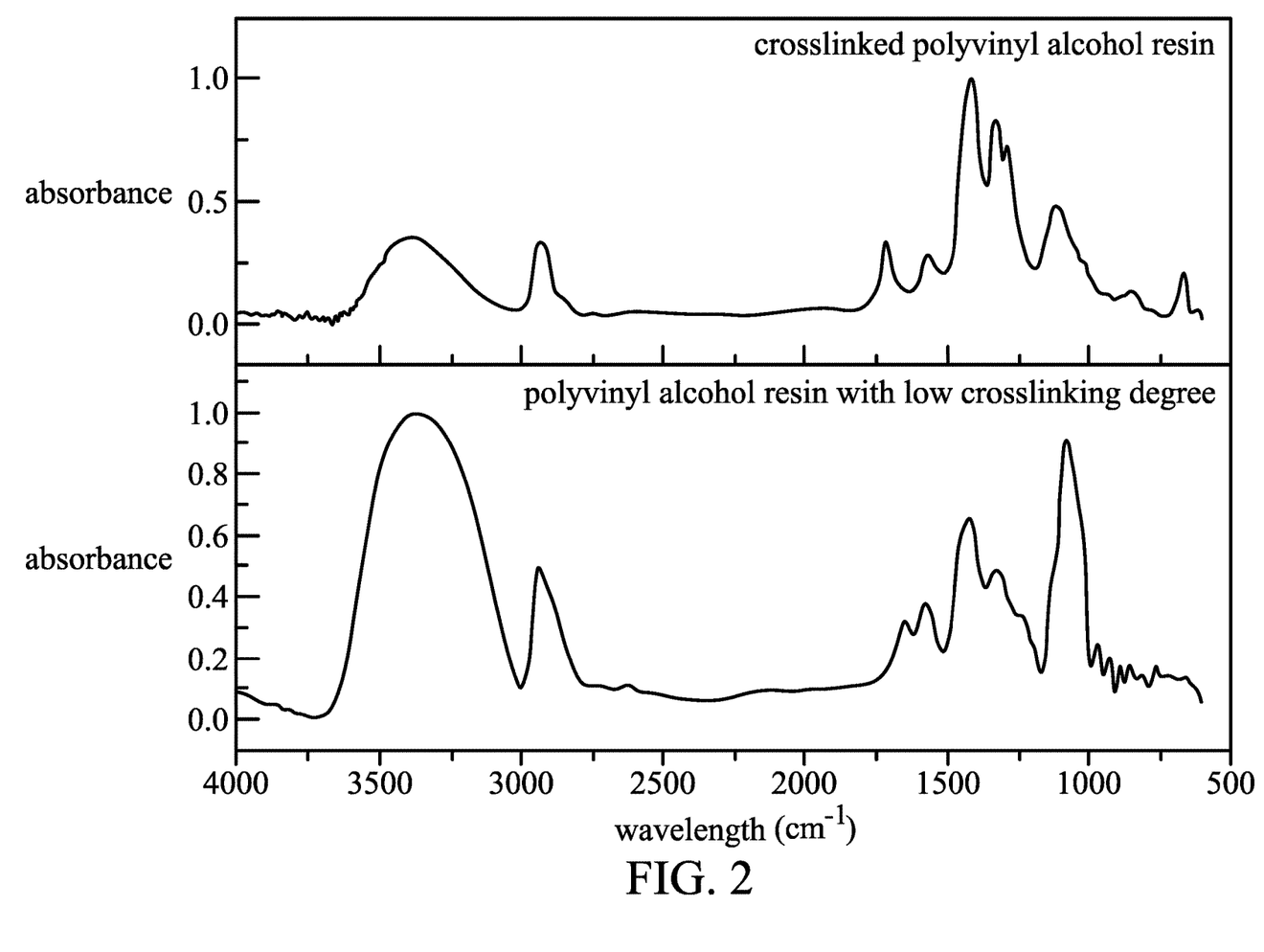
FIG. 2 is a Fourier-transform infrared spectrum of the crosslinked polyvinyl alcohol resin of Preparation Example 1 and the polyvinyl alcohol resin with low crosslinking degree.

A crosslinked polyvinyl alcohol resin (4 parts by weight) (the Fourier-transform infrared spectrum of the crosslinked polyvinyl alcohol resin is shown in FIG. 2) and water (100 parts by weight) were mixed, and then an acetic acid aqueous solution (5M) was added to adjust the pH value of the result to 2-3. After heating the result to 80° C. for 3 hours, a transparent solution including the crosslinked polyvinyl alcohol resin was obtained. Next, an ion-exchange resin (commercially available from Rohm Haas with a trade number of Amberlite IRA743) was mixed with the solution including the crosslinked polyvinyl alcohol resin at room temperature. After stirring for 5 hours, the obtained liquid was filtered to remove the ion-exchange resin. Next, the filtrate was dried at 100° C., obtaining the low crosslinking degree polyvinyl alcohol resin. Next, the low crosslinking degree polyvinyl alcohol resin was analyzed with Fourier transform infrared spectroscopy, and the result is shown in FIG. 2.

As shown in FIG. 2, in comparison with the crosslinked polyvinyl alcohol resin, the low crosslinking degree polyvinyl alcohol resin has a relatively low absorption intensity at 670 cm$^{-1}$ (O—B—O), 1328 cm$^{-1}$ (B—O—C(BO$_4$)), and 1417 cm$^{-1}$ (B—O—C, asymmetrical). It means that the obtained low crosslinking degree polyvinyl alcohol resin has a reduced boron content. Therefore, the obtained polyvinyl alcohol resin has relatively low crosslinking degree after subjecting the crosslinked polyvinyl alcohol resin to a deboration treatment.

Next, the boron content of crosslinked polyvinyl alcohol resin and the low crosslinking degree polyvinyl alcohol resin was determined by inductively coupled plasma mass spectrometry (ICP-MS), and the result is shown in Table 1.

TABLE 1

| | boron content (wt %) |
|---|---|
| crosslinked polyvinyl alcohol resin | 1.23 |
| low crosslinking degree polyvinyl alcohol resin | 0.37 |

As shown in Table 1, after subjecting the crosslinked polyvinyl alcohol resin to a deboration treatment obtained polyvinyl alcohol resin, the boron content is reduced from 1.23 wt % to 0.37 wt %, and the deboration rate is about 70% after measurement.

Preparation of Hydrophobic Polyvinyl Alcohol

Example 1

The polyvinyl alcohol with low crosslinking degree of Preparation Example 1 (1 parts by weight) was added into a glass reactor under nitrogen atmosphere, and then dimethyl sulfoxide (DMSO) (20 parts by weight) was added into the glass reactor. Next, after heating the glass reactor to 80° C., the glass reactor was stirred until the low crosslinking degree polyvinyl alcohol was dissolved completely in dimethyl sulfoxide (DMSO), obtaining a solution. Next, stannous 2-ethyl-hexanoate (Sn(oct)$_2$)) (serving as catalyst) (0.02 parts by weight) was added into the glass reactor. After reacting for 30 minutes, ε-caprolactone (20 parts by weight) was added into the glass reactor, and the glass reactor was heated to 100° C. After reacting for 24 hours, the glass reactor was cooled down to 0° C., and the result was subjected to a reprecipitation. The reprecipitation included dissolving the result with acetone (100 parts by weight), pouring the solution in methanol (1000 parts by weight) to perform a reprecipitation, and collecting the solid. After repeating the aforementioned reprecipitation twice, the obtained solid was heated at 80° C. under vacuum and dried for 5 hours, obtaining the hydrophobic polyvinyl alcohol (1).

The measurement results of nuclear magnetic resonance (NMR) spectrometry of hydrophobic polyvinyl alcohol (1) are shown below. $^1$H NMR (400 MHz, ppm, CDCl$_3$): 5.12-4.92 (—CH$_2$— connected with ε-caprolactone (PCL), m), 4.12-4.02[—(CO)—CH$_2$CH$_2$CH$_2$CH$_2$CH$_2$O, fifth alkylene group (counted from the carbonyl group of ε-caprolactone repeating unit)], 3.70-3.62 [—(CO)—CH$_2$CH$_2$CH$_2$CH$_2$CH$_2$OH, terminal —OH group of PCL repeating unit], 2.35-2.24[—(CO)—CH$_2$CH$_2$CH$_2$CH$_2$CH$_2$O, first alkylene group (counted from the carbonyl group of ε-caprolactone repeating unit)], 1.72-1.56 [—(CO)—CH$_2$CH$_2$CH$_2$CH$_2$CH$_2$OH, second and fourth alkylene group (counted from the carbonyl group of ε-caprolactone repeating unit)], 1.42-1.33 ppm [—(CO)—CH$_2$CH$_2$CH$_2$CH$_2$CH$_2$O, third alkylene group (counted from the carbonyl group of ε-caprolactone repeating unit)].

The average polymerization degree of the polycaprolactone side chain is 15.6 via the measurement of NMR data, and the polycaprolactone substitution degree of the polycaprolactone hydrophobic polyvinyl alcohol (1) is 0.21.

Next, the hydrophobic polyvinyl alcohol (1) was evaluated by Fourier transform infrared spectroscopy (FTIR). The result shown that a larger absorption intensity at 1720 cm$^{-1}$ was observed, and it means that an ester group (containing C=O band) was formed. In addition, a larger absorption intensity at 1639 cm$^{-1}$ was observed, and the absorption intensity was asymmetric stretching vibration of C=O bond in ε-caprolactone It means that polycaprolactone chain was grafted on the polyvinyl alcohol.

Example 2

The polyvinyl alcohol with low crosslinking degree of Preparation Example 1 (1 parts by weight) was added into a glass reactor under nitrogen atmosphere, and then dimethyl sulfoxide (DMSO) (20 parts by weight) was added into the glass reactor. Next, after heating the glass reactor to 80° C., the glass reactor was stirred until the low crosslinking degree polyvinyl alcohol was dissolved completely in dimethyl sulfoxide (DMSO), obtaining a solution. Next, octadecenyl succinic anhydride (0.5 parts by weight) was added into the glass reactor. Next, stannous 2-ethyl-hexanoate (Sn(oct)$_2$) (serving as catalyst) (0.005 parts by weight) was added into the glass reactor, and the glass reactor was heated to 120° C. After reacting for 7 hours, the glass reactor was cooled down to 0° C., and the result was poured in water (1000 parts by weight) to perform a reprecipitation. Next, the obtained solid was washed by methanol twice. Next, the obtained solid was heated at 80° C. under vacuum and dried for 5 hours, obtaining the hydrophobic polyvinyl alcohol (2).

Next, the hydrophobic polyvinyl alcohol (2) was evaluated by Fourier transform infrared spectroscopy (FTIR). The result shown that a larger absorption intensity at 2921 cm$^{-1}$ was observed, and it means that the stretching vibration of CH of alkyl group. In addition, a larger absorption intensity at 1712 cm$^{-1}$ was observed, and it means that an ester group (containing C=O band) was formed.

Example 3

The polyvinyl alcohol with low crosslinking degree of Preparation Example 1 (1 parts by weight) was added into a glass reactor under nitrogen atmosphere, and then dimethyl sulfoxide (DMSO) (20 parts by weight) was added into the glass reactor. Next, after heating the glass reactor to 80° C., the glass reactor was stirred until the low crosslinking degree polyvinyl alcohol was dissolved completely in dimethyl sulfoxide (DMSO), obtaining a solution. Next, 2-(1-docosenyl) succinic anhydride (0.35 parts by weight) was added into the glass reactor. Next, stannous 2-ethyl-hexanoate (Sn(oct)$_2$) (serving as catalyst) (0.005 parts by weight) was added into the glass reactor, and the glass reactor was heated to 120° C. After reacting for 7 hours, the glass reactor was cooled down to 0° C., and the result was poured in water (1000 parts by weight) to perform a reprecipitation. Next, the obtained solid was washed by methanol twice. Next, the obtained solid was heated at 80° C. under vacuum and dried for 5 hours, obtaining the hydrophobic polyvinyl alcohol (3).

Example 4

The polyvinyl alcohol with low crosslinking degree of Preparation Example 1 (2 parts by weight) was added into a glass reactor under nitrogen atmosphere, and water (100 parts by weight) was added into the glass reactor. Next, after heating the glass reactor to 80° C., the glass reactor was stirred until the low crosslinking degree polyvinyl alcohol was dissolved completely in water, obtaining a solution. Next, n-decyltriethoxysilane (4.25 parts by weight) and hydrochloric acid aqueous solution (0.05M, 4.2 parts by weight) was added into the glass reactor. After reacting for 24 hours at room temperature, the result was washed with methanol twice. Next, the obtained solid was heated at 80° C. under vacuum and dried for 5 hours, obtaining the hydrophobic polyvinyl alcohol (4).

Example 5

The polyvinyl alcohol with low crosslinking degree of Preparation Example 1 (1 parts by weight) was added into a glass reactor under nitrogen atmosphere, and then dimethyl sulfoxide (DMSO) (20 parts by weight) was added into the glass reactor. Next, after heating the glass reactor to 80° C., the glass reactor was stirred until the low crosslinking degree polyvinyl alcohol was dissolved completely in dimethyl sulfoxide (DMSO), obtaining a solution. Next, octadecyl isocyanate (5.5 parts by weight) was added into the glass reactor. After reacting at 150° C. for 2 hours, the glass reactor was cooled down to 0° C., and then the result was washed with methanol twice. Next, the obtained solid was heated at 80° C. under vacuum and dried for 5 hours, obtaining the hydrophobic polyvinyl alcohol (5).

Properties Measurement of Hydrophobic Polyvinyl Alcohol

The melting point (Tm), glass transition temperature (Tg), water contact angle, and viscosity of polyvinyl alcohol (commercially available from Emperor Chemical Co., Ltd. with a trade number of BP-05), crosslinked polyvinyl alcohol resin, low crosslinking degree polyvinyl alcohol resin of Preparation Example 1, and hydrophobic polyvinyl alcohol of Examples 1-5 were measured, and the results are shown in Table 2. The melting point (Tm) and glass transition temperature (Tg) were measured by differential scanning calorimetry (DSC). The water contact angle is determined by a photo image taken by high speed camera at the 50 minutes after the water contacts the sample surface. The viscosity is measured by cone plate viscometer (Brookfield dv-iii ultra) at room temperature.

TABLE 2

| | Tm(° C.) | Tg(° C.) | water contact angle (°) | viscosity (cps) |
|---|---|---|---|---|
| polyvinyl alcohol (BP-05) | 200 | 200 | 39.08 ± 2.0 | 5-6 |
| crosslinked polyvinyl alcohol resin | not obvious | not obvious | — | non-flowability |
| low crosslinking degree polyvinyl alcohol resin | 188.7 | −52 | 40.2 ± 0.8 | 4500 |
| hydrophobic polyvinyl alcohol (1) | 53 | −49.38 | 83.8 ± 1.8 | 850 |
| hydrophobic polyvinyl alcohol (2) | 162 | −21.81 | 95.6 ± 0.4 | 3650 |
| hydrophobic polyvinyl alcohol (3) | 188 | — | 103.1 ± 1.5 | 4300 |
| hydrophobic polyvinyl alcohol (4) | 64 | — | 107.1 ± 0.5 | 1320 |
| hydrophobic polyvinyl alcohol (5) | 70 | — | 105.1 ± 1.6 | 1350 |

As shown in Table 2, in comparison with crosslinked polyvinyl alcohol resin, the low crosslinking degree polyvinyl alcohol resin obtained via the deboration treatment exhibits obvious melting point (Tm) and glass transition temperature (Tg). It means that the crosslinking degree of the crosslinked polyvinyl alcohol can be reduced via deboration treatment, thereby increasing the degree of freedom of molecular chain. In addition, the melting point (Tm) of the hydrophobic polyvinyl alcohol (1) is 53.36° C., and it means that the alcohol (PVA) chain is miscible with polycaprolactone (PCL) side chain in the hydrophobic polyvinyl alcohol (1). As shown in Table 2, the obtained hydrophobic polyvinyl alcohol exhibits flowability due to the deboration treatment and hydrophobic modification. In comparison with polyvinyl alcohol (BP-05), the hydrophobic polyvinyl alcohol of the disclosure has increased water contact angle, and higher hydrophobicity.

The water resistance of polyvinyl alcohol (commercially available from Emperor Chemical Co., Ltd. with a trade number of BP-05), crosslinked polyvinyl alcohol resin, and the hydrophobic polyvinyl alcohol of Examples 4 and 5 were measured, and the results are shown in Table 3. The water resistance is measured by the method according to AATCC-22-1985 (wherein the substrate is polyester cloth).

TABLE 3

|  | original water repellent level | water repellent level after flushing 20 times |
|---|---|---|
| polyvinyl alcohol (BP-05) | ISO4 | ISO1 |
| hydrophobic polyvinyl alcohol (4) | ISO4 | ISO2 |
| hydrophobic polyvinyl alcohol (5) | ISO4 | ISO3 |

As shown in Table 3, the water repellent level of the hydrophobic polyvinyl alcohol (4) and (5) of Examples 4 and 5 is merely degraded one level after flushing 20 times (according to AATCC-22-1985), thereby meeting the requirements of "durable water splashing textiles". As a result, the polyvinyl alcohol with some boron crosslinked structures can improve the water resistance of water repellent material.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A hydrophobic polyvinyl alcohol, comprising a first repeating unit, a second repeating unit, and a third repeating unit, wherein the first repeating unit has a structure represented by Formula (I), the second repeating unit has a structure represented by Formula (II), and the third repeating unit has a structure represented by Formula (III):

Formula (I)

Formula (II)

Formula (III)

wherein $R^1$ is —Si$(R^2)_3$, or $R^2$ is independently $C_{1-6}$ alkoxy group, $C_{6-18}$ alkyl group, or $C_{6-22}$ alkenyl group, and at least one of $R^2$ is $C_{6-18}$ alkyl group, or $C_{6-22}$ alkenyl group; $R^3$ and $R^4$ are independently $C_{6-18}$ alkyl group, or $C_{6-22}$ alkenyl group; j is 3 to 7; and k is 1 to 30.

2. The hydrophobic polyvinyl alcohol as claimed in claim 1, wherein the hydrophobic polyvinyl alcohol has n number of first repeating units, m number of second repeating units, and i number of third repeating units, wherein 2n/(2n+m+i) is 0.002 to 0.04, m/(2n+m+i) is 0.58 to 0.783, and i/(2n+m+i) is 0.195 to 0.38.

3. The hydrophobic polyvinyl alcohol as claimed in claim 1, wherein the third repeating unit is wherein $R^3$ and $R^4$ are $C_{6-18}$ alkyl group, or $C_{6-22}$ alkenyl group; j is 3 to 7; k is 1 to 30; $R^5$ is independently $C_{1-6}$ alkyl group; and $R^6$ is $C_{6-18}$ alkyl group or $C_{6-22}$ alkenyl group.

4. The hydrophobic polyvinyl alcohol as claimed in claim 2, further comprising a fourth repeating unit, wherein the fourth repeating unit has a structure represented by Formula (IV):

Formula (IV)

5. The hydrophobic polyvinyl alcohol as claimed in claim 4, wherein the hydrophobic polyvinyl alcohol has p number of fourth repeating units, wherein (2n+4p)/(2n+m+i+4p) is 0.002 to 0.04, m/(2n+m+i+4p) is 0.58 to 0.783, i/(2n+m+i+4p) is 0.195 to 0.38, and n:p is 1:1 to 99:1.

6. The hydrophobic polyvinyl alcohol as claimed in claim 1, wherein a boron content of hydrophobic polyvinyl alcohol is 0.05 wt % to 0.5 wt %, based on the weight of the hydrophobic polyvinyl alcohol.

7. A method for preparing hydrophobic polyvinyl alcohol, wherein the hydrophobic polyvinyl alcohol is the hydrophobic polyvinyl alcohol as claimed in claim 1, comprising:
providing a first polymer, wherein the first polymer is a product of polyvinyl alcohol and boric acid via a crosslinking reaction, wherein a boron content (B1) of the first polymer is 1 wt % to 5 wt %, based on the weight of the first polymer;
subjecting the first polymer to a deboration treatment, obtaining a second polymer, wherein a boron content (B2) of the second polymer boron is 0.05 wt % to 0.5 wt %, based on the weight of the second polymer; and
modifying the second polymer with a modifier, obtaining the hydrophobic polyvinyl alcohol as claimed in claim 1.

8. The method as claimed in claim 7, wherein the boron content (B1) of the first polymer and the boron content (B2) of the second polymer satisfy the following relationship: 0.6≤(B1−B2)/B1≤0.9.

9. The method as claimed in claim 7, wherein the first polymer has the first repeating unit, the second repeating unit, and a fourth repeating unit, wherein the fourth repeating unit has a structure represented by Formula (IV):

Formula (I)

Formula (II)

Formula (IV)

10. The method as claimed in claim 9, wherein the first polymer has a number of first repeating units, b number of second repeating units, and c number of fourth repeating units, wherein (2a+4c)/(2a+b+4c) is 0.2 to 0.5, b/(2a+b+4c) is 0.5 to 0.8, and a:c is 1:1 to 99:1.

11. The method as claimed in claim 10, wherein the second polymer has the first repeating unit, the second repeating unit, and the fourth repeating unit.

12. The method as claimed in claim 10, wherein the second polymer has d number of first repeating units, e number of second repeating units, and f number of fourth repeating units, wherein (2d+4f)/(2d+e+4f) is 0.002 to 0.04, e/(2d+e+4f) is 0.998 to 0.95, and d:f is 1:1 to 99:1.

13. The method as claimed in claim 11, wherein a total number (a+c) of first repeating units and fourth repeating units in the first polymer is greater than a total number (d+f) of first repeating units and fourth repeating units in the second polymer.

14. The method as claimed in claim 7, wherein the modifier is $C_{6-18}$ alkyl group, a siloxane having a $C_{6-22}$ alkenyl group, a succinic anhydride having a $C_{6-18}$ alkyl group, a succinic anhydride having $C_{6-22}$ alkenyl group, an isocyanate having a $C_{6-18}$ alkyl group, an isocyanate having a $C_{6-22}$ alkenyl group, or a lactone having 3-7 carbon atoms.

15. The method as claimed in claim 7, wherein the modifier is $Si(R^2)_4$, $R^2$ is independently $C_{1-6}$ alkoxy group, $C_{6-18}$ alkyl group, or $C_{6-22}$ alkenyl group, and at least one of $R^2$ is $C_{6-18}$ alkyl group, or $C_{6-22}$ alkenyl group, and at least one $R^2$ is $C_{1-6}$ alkoxy group; $R^3$ and $R^4$ is $C_{6-18}$ alkyl group, or $C_{6-22}$ alkenyl group; and j is 3 to 7.

16. The method as claimed in claim 7, wherein the deboration treatment comprises:
mixing the first polymer and water to obtain a first mixture;
adding an acidic aqueous solution into the first mixture to adjust a pH value of the first mixture to 1-5, obtaining a first-polymer-containing solution after heating;
mixing an ion-exchange resin with the first-polymer-containing solution, obtaining a second mixture after stirring;
filtering the second mixture to remove the ion-exchange resin, obtaining a filtrate; and
drying the filtrate, obtaining the second polymer.

17. The method as claimed in claim 16, wherein the acidic aqueous solution is a hydrochloric acid aqueous solution, nitric acid aqueous solution, acetic acid aqueous solution, sulfuric acid aqueous solution, or a combination thereof.

18. The method as claimed in claim 16, wherein the ion-exchange resin has N-methylglucamine group.

19. The method as claimed in claim 16, wherein an amount of ion-exchange resin is 1 wt % to 10 wt %, based on the weight of the first polymer.

* * * * *